(12) United States Patent
Backman

(10) Patent No.: US 11,453,235 B2
(45) Date of Patent: Sep. 27, 2022

(54) CHALK LINE MARKING DEVICE

(71) Applicant: Joshua Backman, Samoa, CA (US)

(72) Inventor: Joshua Backman, Samoa, CA (US)

( * ) Notice: Subject to any disclaimer, the term of this patent is extended or adjusted under 35 U.S.C. 154(b) by 111 days.

(21) Appl. No.: 17/123,301

(22) Filed: Dec. 16, 2020

(65) Prior Publication Data

US 2022/0185005 A1     Jun. 16, 2022

(51) Int. Cl.
*B44D 3/38*     (2006.01)
*G01C 9/28*     (2006.01)

(52) U.S. Cl.
CPC .... *B44D 3/38* (2013.01); *G01C 9/28* (2013.01)

(58) Field of Classification Search
CPC ........................................................ B44D 3/38
USPC ................................................... 33/413, 414
See application file for complete search history.

(56) References Cited

U.S. PATENT DOCUMENTS

| 1,505,286 A * | 8/1924 | Peterson | B44D 3/38 33/414 |
|---|---|---|---|
| 4,660,291 A * | 4/1987 | Dehn | B44D 3/38 33/414 |
| 4,819,337 A * | 4/1989 | Noyes | B44D 3/38 33/414 |
| 6,141,880 A * | 11/2000 | Vircks | H01Q 11/14 33/1 G |
| 6,345,448 B1 * | 2/2002 | Chontos | G01C 15/10 33/339 |
| 9,174,486 B2 * | 11/2015 | Planavsky | B44D 3/38 |
| 10,583,687 B2 * | 3/2020 | Fox | B44D 3/38 |
| 10,926,576 B2 * | 2/2021 | Franco | B44D 3/38 |

\* cited by examiner

*Primary Examiner* — George B Bennett
(74) *Attorney, Agent, or Firm* — The Iwashko Law Firm, PLLC; Lev Ivan Gabriel Iwashko

(57) ABSTRACT

A chalk line marking device, including a main body, including a first section disposed on at least a portion of a first end of the main body, and a second section disposed on at least a portion of a second end of the main body, a handle disposed between the first section and the second section to facilitate gripping thereof, and a chalk string disposed within at least a portion of the main body and the handle, and around a first tip of the main body and a second tip of the main body to move the first section and the second section from bent in a first position to at least partially extended in a second position, such that the chalk string creates a chalk line in response to movement of the first section and the second section.

9 Claims, 3 Drawing Sheets

CHALK LINE MARKING DEVICE

BACKGROUND

1. Field

The present general inventive concept relates generally to a marking device, and particularly, to a chalk line marking device.

2. Description of the Related Art

In certain areas of work, marking a chalk line can be an incredibly labor intensive and grueling process. Moreover, this type of manual labor requires multiple people to complete and other pieces of heavy equipment like a ladder to mark high points on a wall and/or a ceiling. Furthermore, marking the chalk line around particular edges entails extreme stability and might require repetition. Unsurprisingly, the task often leads to frustration among professionals.

The necessity of having multiple people enhances the probability of human error and can lead to incorrect construction of a building and/or installation of hardware.

Therefore, there is a need for chalk line marking device that draws the chalk line without requiring more than one person to mark a point.

SUMMARY

The present general inventive concept provides a chalk line marking device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a chalk line marking device, including a main body, including a first section disposed on at least a portion of a first end of the main body, and a second section disposed on at least a portion of a second end of the main body, a handle disposed between the first section and the second section to facilitate gripping thereof, and a chalk string disposed within at least a portion of the main body and the handle, and around a first tip of the main body and a second tip of the main body to move the first section and the second section from bent in a first position to at least partially extended in a second position, such that the chalk string creates a chalk line in response to movement of the first section and the second section.

The first section may include a first proximal section, a first distal section pivotally disposed on at least a portion of the first proximal section to move from the first position to at least partially toward the second position, and move from the second position to the first position, and a first splined pivot to connect the first proximal section to the first distal section.

The first splined pivot may lock the first distal section at predetermined positions or unlocks to facilitate movement of the first distal section.

The second section may include a second proximal section, a second distal section pivotally disposed on at least a portion of the second proximal section to move from the first position to at least partially toward the second position, and move from the second position to the first position, and a second splined pivot to connect the second proximal section to the second distal section.

The second splined pivot may lock the second distal section at predetermined positions or unlocks to facilitate movement of the second distal section.

The chalk line marking device may further include a plurality of chalk boxes disposed within at least a portion of the first section and at least a portion of the second section to store the chalk therein, such that movement of the chalk string therethrough covers the chalk string in the chalk.

The chalk line marking device may further include a spring tensioning assembly disposed within at least a portion of the main body and the handle, the spring tensioning assembly including a release trigger to move the first section and the second section in response to depressing the release trigger, and a spring connector connected to the release trigger and the chalk string to spring bias the chalk string toward the interior of the handle.

The chalk line marking device may further include a plurality of bubble sections disposed on at least a portion of a first end of the handle and a second end of the handle, each of the plurality of bubble sections including a plurality of bubble levels to indicate a level of a first plane and a second plane, such that each of the plurality of bubble levels is perpendicular with respect to each other.

The chalk line marking device may further include a plurality of wood connectors to removably connect to at least a portion of the first section and at least a portion of the second section to facilitate marking the chalk line around a wooden surface.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
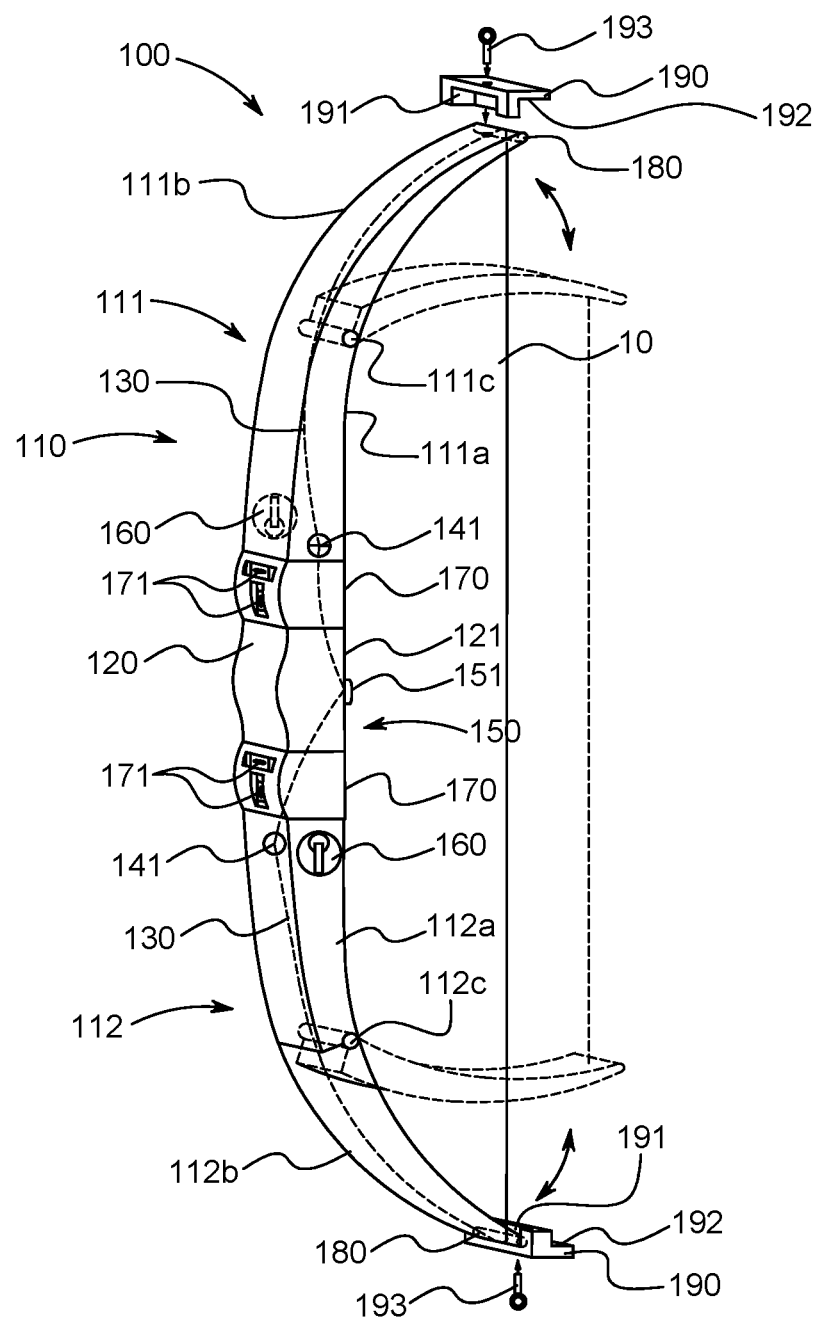
FIG. 1 illustrates a side perspective view of a chalk line marking device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Chalk Line Marking Device 100
Main Body 110
First Section 111
First Proximal Section 111a
First Distal Section 111b
First Splined Pivot 111c
Second Section 112
Second Proximal Section 112a
Second Distal Section 112b
Second Splined Pivot 112c
Handle 120
Handle Cover 121
Cover Fastener 122
Chalk String 130
Chalk Boxes 140
Chalk Box Cover 141
Spring Tensioning Assembly 150
Release Trigger 151
Spring Connector 152
Spring Stops 153
Chalk String Holder 154
Cranks 160
Ratchet 161
Level Sections 170
Bubble Levels 171
Rollers 180
Wood Connectors 190
Body Receiving Groove 191
Surface Receiving Groove 192
Fastener 193

FIG. 1 illustrates a side perspective view of a chalk line marking device 100, according to an exemplary embodiment of the present general inventive concept.

Figure 2:
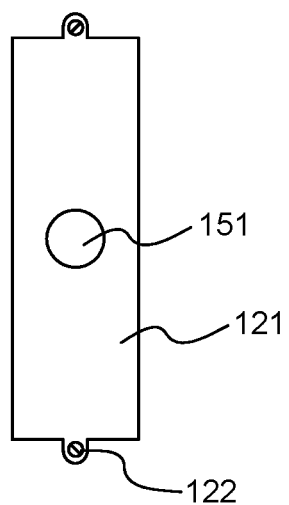
FIG. 2 illustrates a zoomed in view of a handle cover, according to an exemplary embodiment of the present general inventive concept.

FIG. 2 illustrates a zoomed in view of a handle cover 121, according to an exemplary embodiment of the present general inventive concept.

Figure 3:
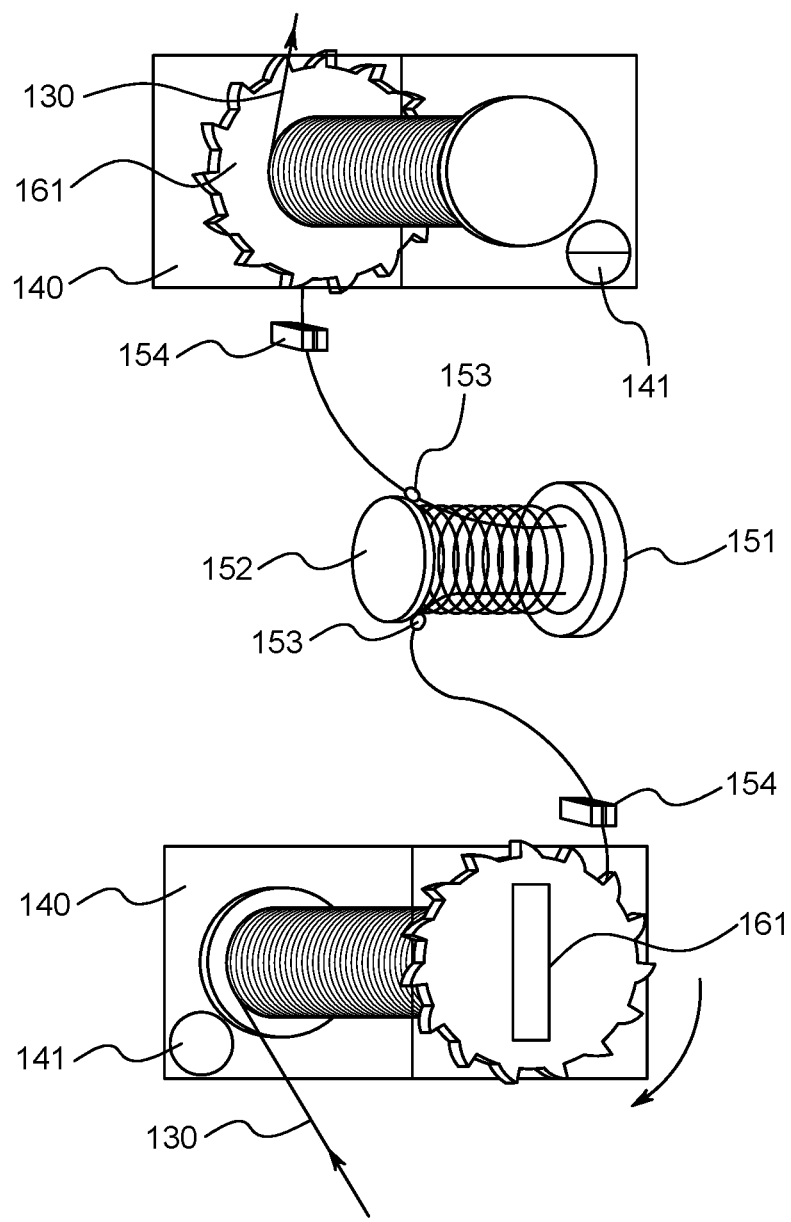
FIG. 3 illustrates a zoomed in view of a chalk string disposed within a plurality of chalk boxes and on a spring tensioning assembly, according to an exemplary embodiment of the present general inventive concept.

FIG. 3 illustrates a zoomed in view of a chalk string 130 disposed within a plurality of chalk boxes 140 and on a spring tensioning assembly 150, according to an exemplary embodiment of the present general inventive concept.

The chalk line marking device 100 may be constructed from at least one of plastic, metal, wood, glass, and rubber, etc., but is not limited thereto.

The chalk line marking device 100 may include a main body 110, a handle 120, a chalk string 130, a plurality of chalk boxes 140, a spring tensioning assembly 150, a plurality of cranks 160, a plurality of level sections 170, a plurality of rollers 180, and a plurality of wood connectors 190 but is not limited thereto.

Referring to FIG. 1, the main body 110 is illustrated to have a bow shape. However, the main body may be rectangular, circular, conical, triangular, pentagonal, hexagonal, heptagonal, octagonal, or any other shape known to one of ordinary skill in the art, but is not limited thereto.

The main body 110 may include a first section 111 and a second section 112, but is not limited thereto.

The first section 111 may be disposed on at least a portion of a first end of the main body 110. The second section 112 may be disposed on at least a portion of a second end of the main body 110 opposite with respect to the first end of the main body 110.

The first section 111 may include a first proximal section 111a, a first distal section 111b, and a first splined pivot 111c, but is not limited thereto.

Referring again to FIG. 1, the first distal section 111b may be pivotally disposed on at least a portion of the first proximal section 111a via the first splined pivot 111c. In other words, the first splined pivot 111c may connect the first proximal section 111a to the first distal section 111b. Moreover, the first distal section 111b may move (i.e. pivot) from a first position (i.e. a bent position illustrated in broken lines) to at least partially toward a second position (i.e. extended position). Furthermore, a first end of the first distal section 111b may be in full contact with an end of the first proximal section 111a during full extension. In other words, the first distal section 111b may be flush with the first proximal section 111a during full extension.

Additionally, the first splined pivot 111c may stop moving at predetermined intervals. In other words, the first splined pivot 111c may lock the first distal section 111b at predetermined positions and/or unlock to facilitate movement of the first distal section 111b.

The second section 112 may include a second proximal section 112a, a second distal section 112b, and a second splined pivot 112c, but is not limited thereto.

Referring again to FIG. 1, the second distal section 112b may be pivotally disposed on at least a portion of the second proximal section 112a via the second splined pivot 112c. In other words, the second splined pivot 112c may connect the second proximal section 112a to the second distal section 112b. Moreover, the second distal section 112b may move (i.e. pivot) from a first position (i.e. a bent position illustrated in broken lines) to at least partially toward a second position (i.e. extended position). Furthermore, a first end of the second distal section 112b may be in full contact with an end of the second proximal section 112a during full extension. In other words, the second distal section 112b may be flush with the second proximal section 112a during full extension.

Additionally, the second splined pivot 112c may stop moving at predetermined intervals. In other words, the second splined pivot 112c may lock the second distal section 112b at predetermined positions and/or unlock to facilitate movement of the second distal section 112b.

The handle 120 may include a handle cover 121 and at least one cover fastener 122 (e.g., a screw, a nail, a nut, a washer, a bolt, an adhesive, a magnet, and/or any combination thereof), but is not limited thereto.

The handle 120 may be disposed between the first section 111 and the second section 112. In other words, the handle 120 may connect the first section 111 to the second section 112 and/or vice versa. The handle 120 may facilitate gripping thereof.

The handle cover 121 may be removably connected to the handle 120 using the at least one cover fastener 122. Accordingly, removing the handle cover 121 may facilitate access to an interior of the handle 120 and/or the main body 110.

The chalk string 130 may be disposed within at least a portion of the main body 110 and/or the handle 120. Moreover, the chalk string 130 may extend from the first distal section 111b to the second distal section 112b within the main body 110 and/or the handle 120.

Each of the plurality of chalk boxes 140 may include a chalk box cover 141, but is not limited thereto.

Referring to FIGS. 1 and 3, each of the plurality of chalk boxes 140 may be disposed within at least a portion of the first proximal section 111a and/or the second proximal section 112a. Additionally, each of the plurality of chalk boxes 140 may store chalk therein. Also, the chalk string 130 may move through the plurality of chalk boxes 140, such that the chalk string 130 may be covered in the chalk.

The chalk box cover 141 may be removably connected to at least a portion of each of the plurality of chalk boxes 140 to cover at least a portion of each of the plurality of chalk boxes 140. Therefore, the chalk box cover 141 may be removed to allow chalk to be inserted within the plurality of chalk boxes 140.

Also, the chalk string 130 may be accessed after removing the handle cover 121, such that the chalk string 130 may be replaced.

The spring tensioning assembly 150 may include a release trigger 151, a spring connector 152, a plurality of spring stops 153, and at least one chalk string holder 154, but is not limited thereto.

The spring tensioning assembly 150 may be disposed within at least a portion of the main body 110 and/or the handle 120. More specifically, the release trigger 151 may be disposed on and/or within at least as portion of the handle cover 121. The spring connector 152 may be connected to the release trigger 151 and/or the chalk string 130.

Referring to FIG. 3, the chalk string 130 may wrap around the spring connector 152. Also, the spring connector 152 may be spring biased to move (i.e. rotate) the chalk string 130 thereto. In other words, the spring connector 152 may receive the chalk string 130 thereon and spring bias the chalk string 130 toward the interior of the handle 120. Furthermore, each of the plurality of spring stops 153 may prevent the spring connector 152 from moving.

The at least one chalk string holder 154 may facilitate movement of the chalk string 130 within the main body 110 and/or the handle 120. In particular, the at least one chalk string holder 154 may guide the chalk string 130 during movement within the main body 110 and/or the handle 120, such that the chalk string 130 may not be loose.

In operation, the plurality of spring stops 153 may release the spring connector 152 in response to depressing the release trigger 151, such that the spring connector 152 may rotate to move the chalk string 130 toward the interior of the handle 120, such that the first distal section 111b and/or the second distal section 112b may move at least partially toward the second position. In other words, the first distal section 111b and/or the second distal section 112b may move at least partially toward the second position in response to depressing the release trigger 151 in a snapping motion. Also, releasing the release trigger 151 may allow the first distal section 111b and/or the second distal section 112b to move to the predetermined positions based on the first splined pivot 111c and/or the second splined pivot 112c.

Each of the plurality of cranks 160 may include a ratchet 161, but is not limited thereto.

The plurality of cranks 160 may be disposed on at least a portion of the first proximal section 111a and/or the second proximal section 112a. Moreover, each of the plurality of cranks 160 may be connected to the ratchet 161, such that the ratchet 161 rotates in response to rotation of the plurality of cranks 160. The plurality of cranks 160 may be rotated in a first direction (i.e. clockwise) or a second direction (i.e. counterclockwise) to move the first distal section 111b and/or the second distal section 112b toward the first position. As such, the plurality of cranks 160 may reset the first distal section 111b and/or the second distal section 112b to the first position.

Each of the plurality of level sections 170 may include a plurality of bubble levels 171, but is not limited thereto.

The plurality of bubble sections 170 may be disposed on at least a portion of a first end of the handle 120 and/or a second end of the handle 120. Additionally, the plurality of bubble levels 171 may provide an indication of a level on a first plane and/or a second plane different from the first plane. Also, each of the plurality of bubble levels 171 may be perpendicular with respect to the each other. As such, the plurality of bubble levels 171 may provide level readings on two planar surfaces, such as a ground surface and/or a wall perpendicularly disposed with respect to the ground surface.

Accordingly, the plurality of bubble levels 171 may facilitate measuring angles and positions on the planar surface.

The plurality of rollers 180 may be disposed on at least a portion of a second end of the first distal section 111b (i.e. a first tip of the main body 110) and/or a second end of the second distal section 112b (i.e. a second tip of the main body 110). The chalk string 130 may be disposed around each of the plurality of rollers 180, such that the chalk string 130 may loop around the plurality of rollers 180 and back within the main body 110. As such, the chalk string 130 moving along the plurality of rollers 180 may mark a chalk line on the planar surface in response to depressing the release trigger 151.

Each of the plurality of wood connectors 190 may include a body receiving groove 191, a surface receiving groove 192, and a fastener 193 (e.g., a screw, a nail, a nut, a washer, a bolt, an adhesive, a magnet, and/or any combination thereof), but is not limited thereto.

The plurality of wood connectors 190 may be removably connected to at least a portion of the second end of the first distal section 111b and/or the second end of the second distal section 112b. Specifically, the body receiving groove 191 may receive the second end of the first distal section 111*b* and/or the second end of the second distal section 112*b*.

The surface receiving groove 192 may receive a wooden surface (e.g., a board of plywood) therein. Finally, the fastener 193 may be removably inserted through the body receiving groove 191 to connect the plurality of wood connectors 190 to the second end of the first distal section 111*b* and/or the second end of the second distal section 112*b*. As such, the plurality of wood connectors 190 may facilitate marking the chalk line around the wooden surface, such as for a rip cut and/or a stud marking.

Therefore, the chalk line marking device 100 may facilitate creating a line with chalk without requiring another person. Also, the chalk line marking device 100 may create lines at a desired angle and/or position due to the plurality of bubble levels 171.

The present general inventive concept may include a chalk line marking device 100, including a main body 110, including a first section 111 disposed on at least a portion of a first end of the main body 110, and a second section 112 disposed on at least a portion of a second end of the main body 110, a handle 120 disposed between the first section 111 and the second section 112 to facilitate gripping thereof, and a chalk string 130 disposed within at least a portion of the main body 110 and the handle 120, and around a first tip of the main body 110 and a second tip of the main body 110 to move the first section 111 and the second section 112 from bent in a first position to at least partially extended in a second position, such that the chalk string 130 creates a chalk line in response to movement of the first section 111 and the second section 112.

The first section 111 may include a first proximal section 111*a*, a first distal section 111*b* pivotally disposed on at least a portion of the first proximal section 111*a* to move from the first position to at least partially toward the second position, and move from the second position to the first position, and a first splined pivot 111*c* to connect the first proximal section 111*a* to the first distal section 111*b*.

The first splined pivot 111*c* may lock the first distal section 111*b* at predetermined positions or unlocks to facilitate movement of the first distal section 111*b*.

The second section 112 may include a second proximal section 112*a*, a second distal section 112*b* pivotally disposed on at least a portion of the second proximal section 112*a* to move from the first position to at least partially toward the second position, and move from the second position to the first position, and a second splined pivot 112*c* to connect the second proximal section 112*a* to the second distal section 112*b*.

The second splined pivot 112*c* may lock the second distal section 112*b* at predetermined positions or unlocks to facilitate movement of the second distal section 112*b*.

The chalk line marking device 100 may further include a plurality of chalk boxes 140 disposed within at least a portion of the first section 111 and at least a portion of the second section 112 to store the chalk therein, such that movement of the chalk string 130 therethrough covers the chalk string 130 in the chalk.

The chalk line marking device 100 may further include a spring tensioning assembly 150 disposed within at least a portion of the main body 110 and the handle 120, the spring tensioning assembly 150 including a release trigger 151 to move the first section 111 and the second section 112 in response to depressing the release trigger 151, and a spring connector 152 connected to the release trigger 151 and the chalk string 130 to spring bias the chalk string 130 toward the interior of the handle 120.

The chalk line marking device 100 may further include a plurality of bubble sections 170 disposed on at least a portion of a first end of the handle 120 and a second end of the handle 120, each of the plurality of bubble sections 170 including a plurality of bubble levels 171 to indicate a level of a first plane and a second plane, such that each of the plurality of bubble levels 171 is perpendicular with respect to each other.

The chalk line marking device 100 may further include a plurality of wood connectors 190 to removably connect to at least a portion of the first section 111 and at least a portion of the second section 112 to facilitate marking the chalk line around a wooden surface.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A chalk line marking device, comprising:
 a main body, comprising:
  a first section disposed on at least a portion of a first end of the main body, and
  a second section disposed on at least a portion of a second end of the main body;
 a handle disposed between the first section and the second section to facilitate gripping thereof; and
 a chalk string disposed within at least a portion of the main body and the handle, and around a first tip of the main body and a second tip of the main body to move the first section and the second section from bent in a first position to at least partially extended in a second position, such that the chalk string creates a chalk line in response to movement of the first section and the second section.

2. The chalk line marking device of claim 1, wherein the first section comprises:
 a first proximal section;
 a first distal section pivotally disposed on at least a portion of the first proximal section to move from the first position to at least partially toward the second position, and move from the second position to the first position; and
 a first splined pivot to connect the first proximal section to the first distal section.

3. The chalk line marking device of claim 2, wherein the first splined pivot locks the first distal section at predetermined positions or unlocks to facilitate movement of the first distal section.

4. The chalk line marking device of claim 1, wherein the second section comprises:
 a second proximal section;
 a second distal section pivotally disposed on at least a portion of the second proximal section to move from the first position to at least partially toward the second position, and move from the second position to the first position; and
 a second splined pivot to connect the second proximal section to the second distal section.

5. The chalk line marking device of claim 4, wherein the second splined pivot locks the second distal section at predetermined positions or unlocks to facilitate movement of the second distal section.

6. The chalk line marking device of claim 1, further comprising:

a plurality of chalk boxes disposed within at least a portion of the first section and at least a portion of the second section to store the chalk therein, such that movement of the chalk string therethrough covers the chalk string in the chalk.

7. The chalk line marking device of claim 1, further comprising:
   a spring tensioning assembly disposed within at least a portion of the main body and the handle, the spring tensioning assembly comprising:
      a release trigger to move the first section and the second section in response to depressing the release trigger, and
      a spring connector connected to the release trigger and the chalk string to spring bias the chalk string toward the interior of the handle.

8. The chalk line marking device of claim 1, further comprising:
   a plurality of bubble sections disposed on at least a portion of a first end of the handle and a second end of the handle, each of the plurality of bubble sections comprising:
      a plurality of bubble levels to indicate a level of a first plane and a second plane, such that each of the plurality of bubble levels is perpendicular with respect to each other.

9. The chalk line marking device of claim 1, further comprising:
   a plurality of wood connectors to removably connect to at least a portion of the first section and at least a portion of the second section to facilitate marking the chalk line around a wooden surface.

\* \* \* \* \*